8/11/87 XR 4,686,537

United States Patent [19]
Hidaka et al.
[11] Patent Number: 4,686,537
[45] Date of Patent: Aug. 11, 1987

[54] PRIMARY RADIATOR FOR CIRCULARLY POLARIZED WAVE

[75] Inventors: Kazutaka Hidaka, Yokohama; Hisashi Sawada, Tokyo, both of Japan

[73] Assignee: Kabushiki Kaisha Toshiba, Kawasaki, Japan

[21] Appl. No.: 815,041

[22] Filed: Dec. 31, 1985

[30] Foreign Application Priority Data

Jan. 9, 1985 [JP] Japan ............................ 60-000809

[51] Int. Cl.[4] ............................ G01S 1/08; H04B 7/19

[52] U.S. Cl. ............................ 343/786; 343/756; 343/783; 333/21 A

[58] Field of Search ............................ 343/756, 783, 786; 333/21 A

[56] References Cited

U.S. PATENT DOCUMENTS 4,141,013 2/1979 Crail et al. ............................ 343/756
4,523,160 6/1985 Ploussios ............................ 333/21 A

FOREIGN PATENT DOCUMENTS 59-154802 9/1984 Japan .
60-17243 5/1985 Japan .

OTHER PUBLICATIONS

IEEE Transactions on Microwave Theory and Techniques, "Circular Polarizers of Fixed Bandwidth", J. R. Pyle, Sep. 1984, pp. 557-559.

*Primary Examiner*—Robert E. Wise
*Assistant Examiner*—D. Johnson
*Attorney, Agent, or Firm*—Schwartz, Jeffery, Schwaab, Mack, Blumenthal & Evans

[57] ABSTRACT

A primary radiator for circularly polarized wave in accordance with the present invention is equipped with conductor projections along the inner wall of the horn antenna in order to convert linearly polarized wave to circularly polarized wave within the horn antenna, without adapting the prior art generator of circularly polarized wave. Consequently, it becomes possible to reduce the axial length and the overall size of the radiator. Moreover, the conductor projections are constructed with their edge sections on the aperture end side of the horn antenna sloping down along the inner wall of the horn antenna, so that generation of higher order modes can be suppressed and a satisfactory directivity can be obtained.

8 Claims, 12 Drawing Figures

PRIMARY RADIATOR FOR CIRCULARLY POLARIZED WAVE

BACKGROUND OF THE INVENTION

1. Field of the Invention

The present invention relates to a primary radiator for circularly polarized wave, in particular, to the provision of a primary radiator for circularly polarized wave which makes it possible to realize wide-band uniformity of axial ratio as well as to obtain a satisfactory directivity for circularly polarized wave, without expressly increasing the size of the device.

2. Description of the Prior Art

Referring to FIG. 1, a simplified cross-sectional view of a prior art primary radiator for circularly polarized wave is shown with reference numeral 10. In the figure, the section between A—A′ and B—B′ is a conical horn antenna 12, and the section between B—B′ and C—C′ which joins to the above is a circularly polarized wave generator 14. The circularly polarized wave generator 14 is for converting a linearly polarized wave (electromagnetic wave) to a circularly polarized wave. As is well known, conversion of a linearly polarized wave E to a circularly polarized wave is accomplished by decomposing E into mutually orthogonal components $E_1$ and $E_2$ and delaying (or advancing) the orthogonal incident electric field $E_1$ by 90° with respect to the incident electric field $E_2$, as shown in FIG. 1. To achieve this, a pair of conductor pieces 18 and 18′ are provided on the inner side of a circular waveguide 16.

According to the prior art, a primary radiator for circularly polarized wave has been developed with horn antenna 12 and circularly polarized wave generator 14 as mutually independent, and it has been put to practical use by coupling these parts to each other. However, when the frequency characteristics of the axial ratio which represent the quality of the circularly polarized wave is attempted to be valid uniformly over a wide range of frequency, the prior art radiator gives rise to various kinds of difficulties as will be described below.

As an example of an antenna in which wide-band uniformity of axial ratio is required, one may mention the antenna for receiving satellite broadcast in the 12 GHz band. In this instance, Japan is assigned a band of 300 MHz, while the United States is assigned a band of 500 MHz, by the World Administrative Radio Conference (WARC-BS).

In the prior art circularly polarized wave generator 14, it becomes necessary to reduce the thickness D of the conductor pieces 18 and 18′ in order to assure the wide-band uniformity of axial ratio. In that case, however, there is a disadvantage that the axis of the circular waveguide has to be made long. The reason for this is as follows. The result of study of the frequency characteristics of the phase difference, when the thickness D of the conductor pieces 18 and 18′ in the circular waveguide 16 of radius R = 12.0 mm is varied from 3.6 mm to 2.4 mm and 1.2 mm, is as shown in FIG. 2. It should be noted in this case that a perfect circularly polarized wave is designed to be obtained for the frequency of 12.45 GHz with a phase difference of 90°. As may be seen from FIG. 2, uniformity of axial ratio can be accomplished through decrease in the valve of D, with a reduction in the deviation of the phase difference from 90° over a wide range of frequency. In this case, however, the length of the conductor pieces along the axis of the circular waveguide is found to increase gradually from 36.7 mm, 78.0 mm to 297.5 mm. In other words, with the prior art system, the total length of the primary radiator for circularly polarized wave is increased necessarily, and the system is rendered large in size, when wide-band uniformity of the axial ratio characteristic for circularly polarized wave is attempted.

On the other hand, when the phase difference between the orthogonal components of the electric field was examined for the values of radius R from 8.12 mm and 10.1 mm to 12.0 mm, by fixing the ratio D/R of the thickness D of the conductor pieces to the radius R of the circular waveguide at a constant value, for instance, D/R=0.1, a result as shown in FIG. 3 was found to exist. Here, the center frequency is chosen at 12.45 GHz at which a phase difference of 90° is set to be achieved to realize a perfect circularly polarized wave there. As may be clear from the figure, the axial ratio characteristic approaches flat with decreasing deviation from 90° as the radius R is increased. That is, it will be seen that the axial ratio characterictic can be made uniform over a wide range of frequency. Even in this case, however, reduction in size and weight cannot be accomplished since wide band uniformity is realizable only by increasing the radius R of the circular waveguide.

Further, as another example of the prior art, there is known a primary radiator for circularly polarized wave which has a large number of pairs of vertical plates provided at the opposite corners on the inside of a rectangular horn antenna, for converting a linearly polarized wave to a circularly polarized wave. Generally speaking, in the case when the waveguide is constructed with uniform cross section and straight tube axis, and when there is no obstacle on the tube wall, each mode of the multiple modes in the waveguide propagates independently without mutual interference. However, if obstacles such as multiple pairs of vertical plates are installed in the interior of the waveguide, then the mode independence can no longer be maintained and mode coupling will be generated. For instance, when a large number of metallic plates or the like are placed inside the waveguide, the boundary conditions at these points become discontinuous and the electromagnetic wave undergoes a large scattering there. Consequently, the mode of the electromagnetic wave in the waveguide becomes a disurbed one that includes many higher order modes other than the fundamental mode at the discontinuity points, necessarily deteriorating the characteristics of the circularly polarized wave. Therefore, a radiator with a plurality of vertical plates, as mentioned in the above, has a disadvantage in that satisfactory directivity for circularly polarized wave cannot be obtained due to inclusion of many higher order modes.

SUMMARY OF THE INVENTION

An object of the present invention is to provide a primary radiator for circularly polarized wave which makes it possible to reduce the size of the device as well as to obtain a satisfactory directivity for circularly polarized wave by uniformizing the frequency characteristic of the axial ratio over a wide range of frequency.

Another object of the present invention is to provide a primary radiator for circularly polarized wave which can be manufactured with dimensional precision of high accuracy.

Still another object of the present invention is to provide a primary radiator for circularly polarized wave which can be mass produced with stabilized frequency characteristic of axial ratio.

According to the preferred embodiments of the present invention there are provided conductor projections along the inner wall of a horn antenna with the end section of the conductor projection on the antenna aperture side sloped down along the inner wall of the horn antenna, so as to convert linearly polarized wave to circularly polarized wave within the horn antenna, without the use of the existing circularly polarized wave generator.

These and other objects, features and advantages of the present invention will be more apparent from the following description of preferred embodiments, taken in conjunction with the accompanying drawings.

DESCRIPTION OF THE PREFERRRED EMBODIMENTS

Figure 4:
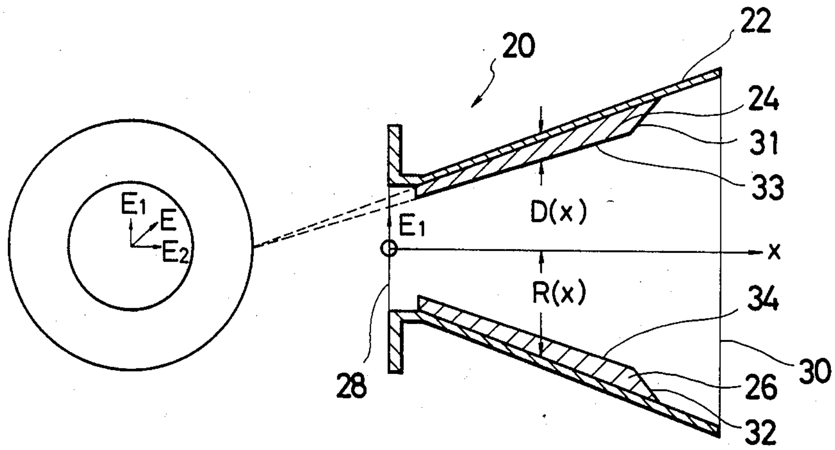
FIG. 4 is a simplified diagram for a primary radiator for circularly polarized wave embodying the present invention.

Referring to FIG. 4, there is shown an embodiment of the primary radiator for circularly polarized wave in accordance with the present invention with reference numeral 20.

The primary radiator for circularly polarized wave 20 comprises a horn antenna 22 which is constructed so as to widen gradually from the feeding end 28 toward the aperture end 30, and conductor projections 24 and 26 that are made of, for example, copper, silver, aluminum, alminum system alloy, or brass laid along the inner wall of the horn antenna 22. The conductor projections 24 and 26 may be formed by using the same material as for the horn antenna 22 in a unified body or may be formed as a separate body. These conductor projections 24 and 26 are installed facing each other in the direction of one of the components, for example, $E_1$, of the two orthogonal electric fields $E_1$ and $E_2$ of the electric field E that is incident upon the feeding end 28 of the horn antenna 22. Moreover, the thickness and the length of the conductor projections 24 and 26 are set so as to produce a desired circularly polarized wave, namely, the orthogonal electric fields $E_1$ and $E_2$ that have the same phase at the feeding end 28 of the horn antenna 22 will have a phase difference which falls within a tolerated range that has 90° as the standard value, at the aperture end 30. Furthermore, in order to exclude the higher order modes the end sections 31 and 32 on the aperture end 30 side of the conductor projections 24 and 26 of the primary radiator for circularly polarized wave are constructed to slope down toward the aperture end 30 along the inner wall of the horn antenna 22.

Figure 1:
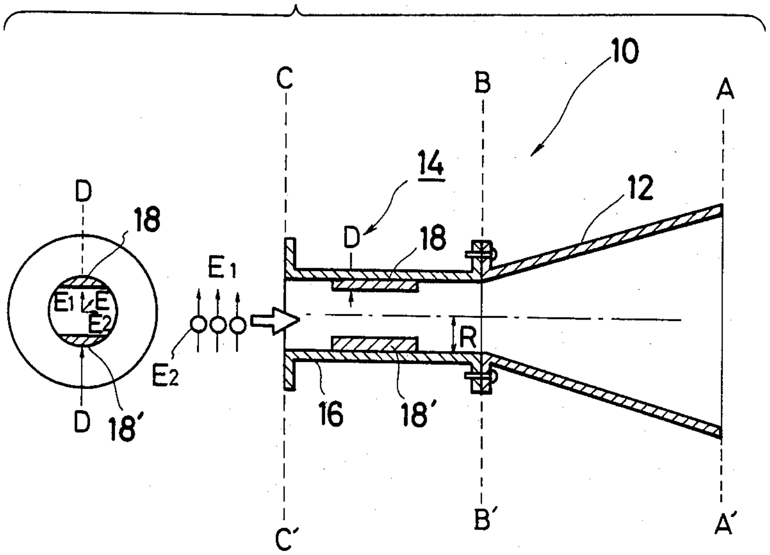
FIG. 1 PRIOR ART
FIG. 1 is a simplified diagram for a prior art primary radiator for circularly polarized wave.
Figure 2:
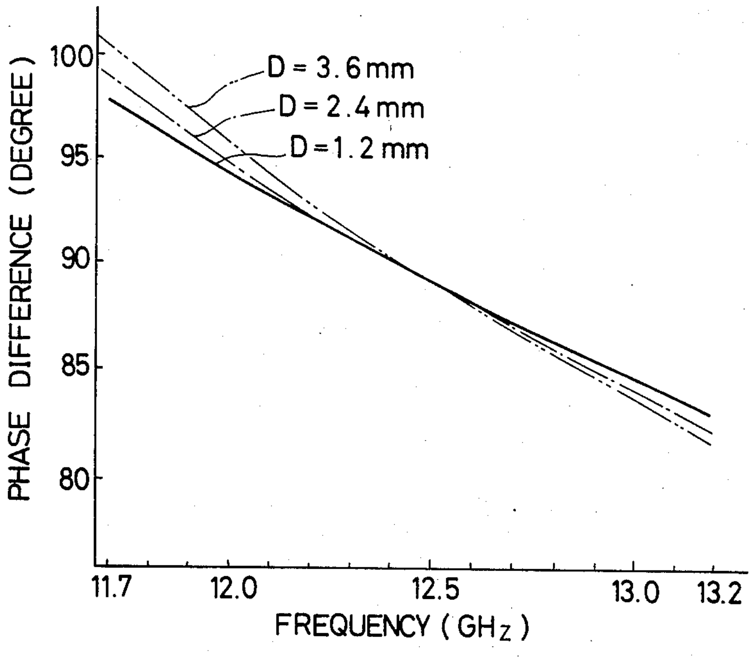
FIG. 2 is a graph for illustrating the phase difference change vs. the frequency for various values of the conductor thickness D of the primary radiator for circularly polarized wave shown in FIG. 1.
Figure 3:
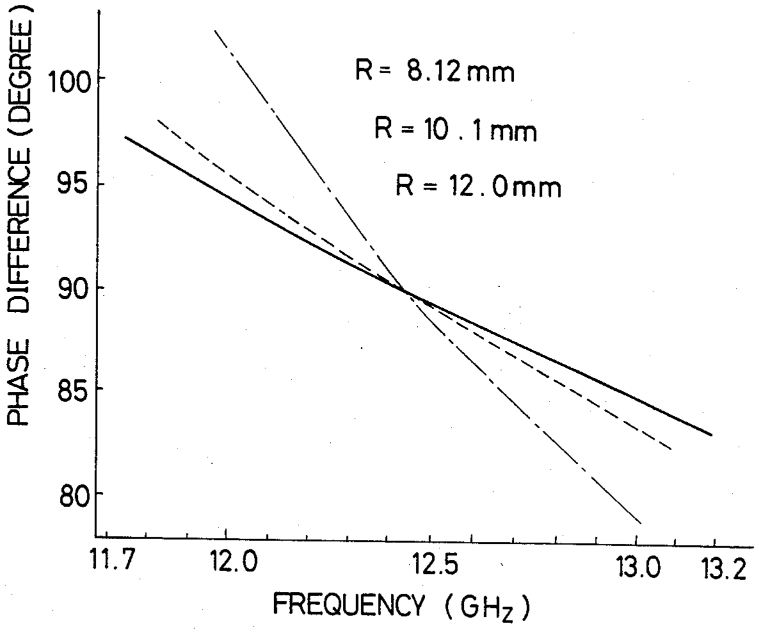
FIG. 3 is a graph for illustrating the phase difference change vs. the frequency for various values of the radius R of the circular waveguide of the primary radiator for circularly polarized wave shown in FIG. 1.

If metallic projections 24 and 26 are installed in such a primary radiator to have a constant value, for example, for the ratio D(x)/R(x) of the thickness D(x) of the conductor projections 24 and 26 to the radius R(x) of the horn Antenna 22, then there will be obtained a primary radiator for circularly polarized wave with a total length smaller than for the prior art primary radiator for circularly polarized wave shown in FIG. 1. Moreover, for a constant ratio of D(x)/R(x), it satisfies the condition for realizing more easily the wide-band uniformity of the characteristic as may be clear from the experimental finding shown in FIG. 3. This is because the metallic projections 24 and 26 are installed in the region where the radius is greater than that of the feeding end which is at the base of the horn antenna 22. Furthermore, as was mentioned in the foregoing, the conductor projections 24 and 26 are opening gradually toward the side of aperture end 30 and the end sections 31 and 32 on the side of the aperture end 30 slope down along the inner wall of the horn antenna 22, so that there will be generated hardly any higher order mode at the conductor projections 24 and 26 and at these end sections 31 and 32 as was the case for the prior art device. Thus, it becomes possible to obtain a satisfactory directivity for circularly polarized wave.

Figure 5:
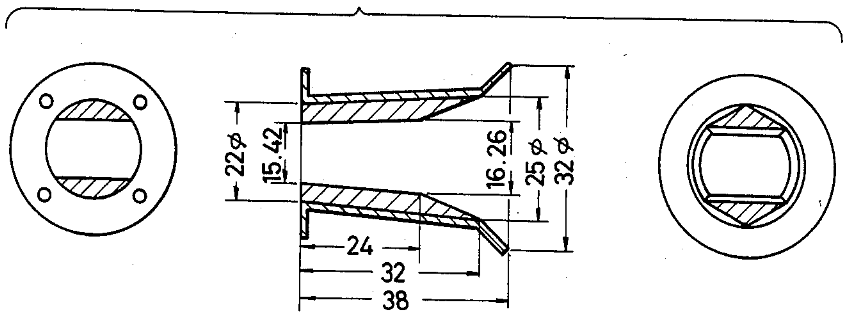
FIG. 5 is a diagram for illustrating an example of the primary radiator for circularly polarized wave trially manufactured as a second embodiment of the present invention.
Figure 6:
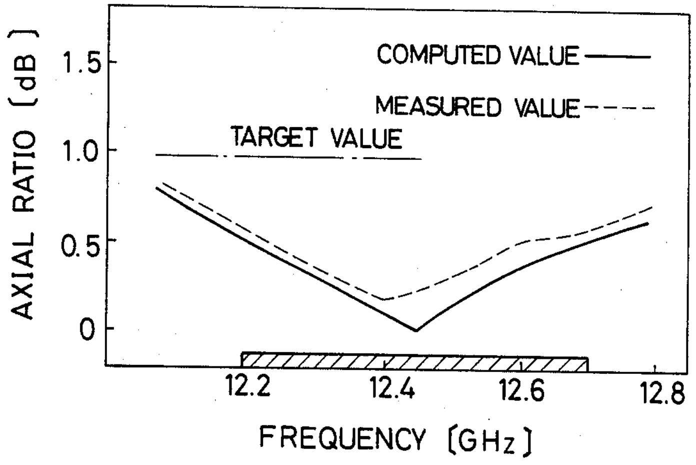
FIGS. 6 and 7 are graphs showing the measured characteristics for the trially manufactured example shown in FIG. 5.
Figure 7:
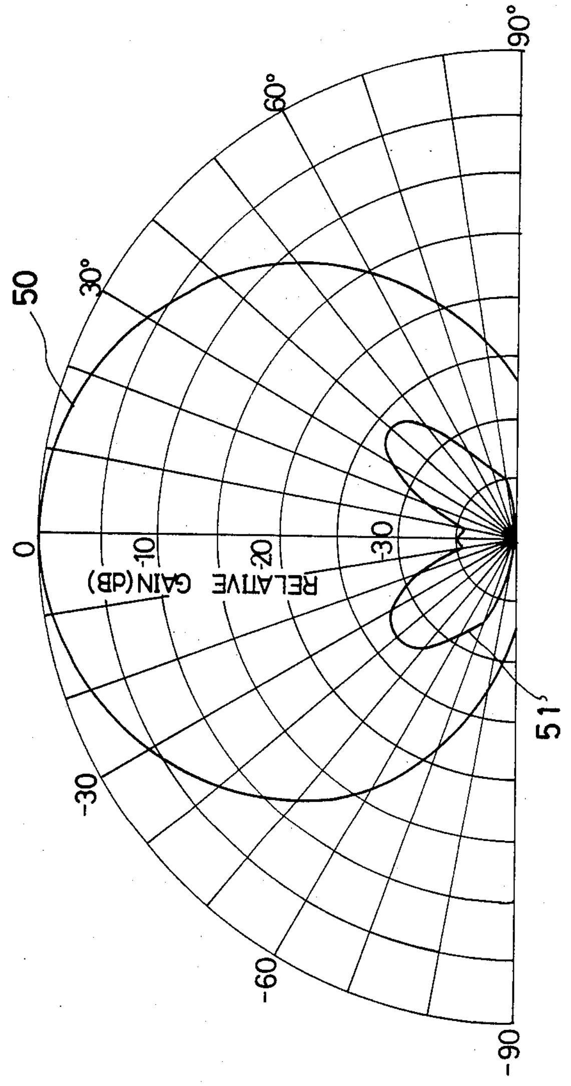

In FIG. 5 is shown a primary radiator for circularly polarized wave which was designed based on the above principle and actually trially manufactured. It has a frequency of from 12.2 GHz to 12.7 GHz, a bandwidth of 500 MHz, and an axial ratio of less than 0.7 dB. The dimensions (in the unit of mm) that are needed for electrical calculations are given in the figure, and the measured and computed values for the electrical characteristic of the radiator are shown in FIG. 6. The computed values are obtained based on the transmission line model in which thinly sliced waveguides are connected in cascading manner along the axial direction. In addition, the result of measurement on the directivity of the main polarized wave at the center frequency of 12.45 GHz is shown in FIG. 7 as solid line 50. The directivity for the cross polarized wave is shown by solid line 51.

As may be seen from FIG. 6 there was obtained a satisfactory axial ratio characteristic with values of less than 0.6 dB over the entire hatched range of frequency. Also, as seen from FIG. 7, the beam width corresponding to the edge level 10 dB of the reflector is about 90°, giving a satisfactory directivity. From these results it was confirmed that there occurs no distortion in the radiation pattern due to installment of the conductor projections as in the above on the inside of the horn antenna 22.

In the embodiment of the invention shown in FIG. 5, the tip 36 of the horn antenna is bent further outward with increased rate of widening starting with the edge sections 44 and 46 on the aperture end 42 side of the conductor projections 38 and 40. Accordingly, the arrangement has an effect that the axial length of the horn antenna can be reduced compared with the case of extension without bending for realizing idential aperture. Further, it is known that the mixing of a small fraction of $TM_{11}$ mode with $TE_{11}$ mode brings about an improvement in the axial ratio characteristic of the directivity. Hence, directivity with satisfactory characteristics of circularly polarized wave can be obtained due to generation of the $TM_{11}$ mode at the edge sections 44 and 46 that are bent. Moreover, the axial symmetry is also satisfactory.

It should be noted that the axial length of the primary radiator for circularly polarized wave that was trially manufactured is a small value of 38 mm, which fact will be of great use in the practical applications.

Figure 8:
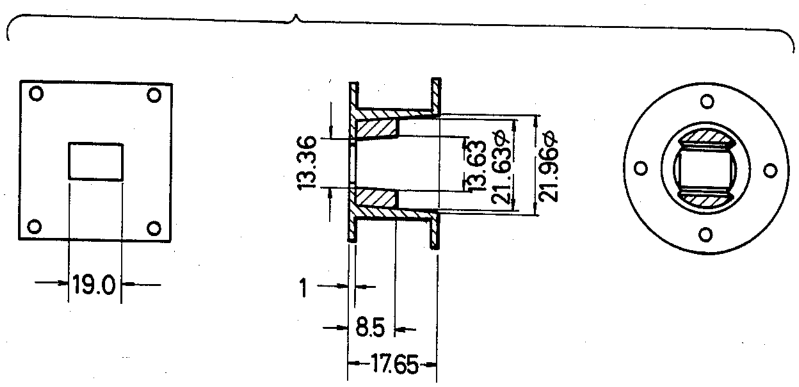
FIG. 8 is a simplified diagram for a circular-to-rectangular transducer used for the measurements in FIGS. 6 and 7.

The electrical characteristics shown in FIGS. 6 and 7 are the results of measurements obtained by connecting the trially manufactured primary radiator for circularly polarized wave shown in FIG. 5 to the circular-to-rectangular transducer shown in FIG. 8, and by attaching a radome made of teflon of thickness 0.5 mm.

As may be clear from the preceding description, the primary radiator for circularly polarized wave in accordance with the present invention can meet the recent requirements and produce various effects that have been mentioned in the foregoing. Of these the reasons for the occurrence of the effects in mass productivity are the following.

The inner surface of the horn antenna and the surfaces 33 and 34 of the metallic projections 24 and 26 can be formed tapered in the same direction as for the horn. Therefore, the aluminum die cast formation techniques can become applicable to the manufacture of the radiator, which makes the mass production of the radiator possible. Now, for a radiator such as the one to be used for receiving antenna for television broadcast by satellite, there is a requirement that it should be possible to be mass produced. In a case like this, it may also become possible to achieve a cost reduction through favorable effect of mass production.

Referring to FIGS. 9 to 12, there are shown other embodiments of the primary radiator for circularly polarized wave in accordance with the present invention, with identical numbers assigned to identical parts that appeared in the previous embodiment.

Figure 9:
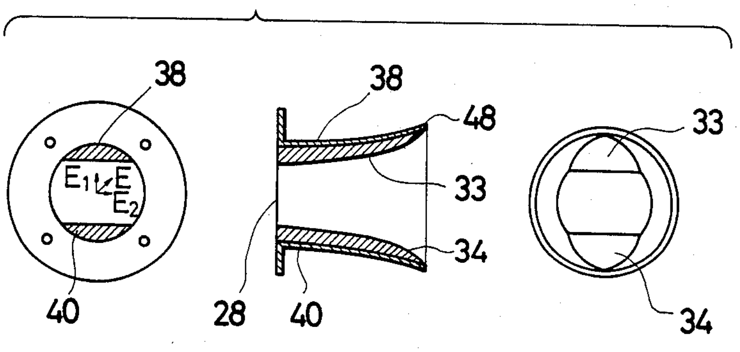
FIG. 9 is a simplified diagram for a third embodiment of the primary radiator for circularly poralized wave in accordance with the present invention.

In a third embodiment of the invention shown in FIG. 9, horn 48 is widened outward by gradual change in the curvature so that it, will be more effective for wide-band uniformity of the characteristic to suppression of generation of higher order modes.

Figure 10:
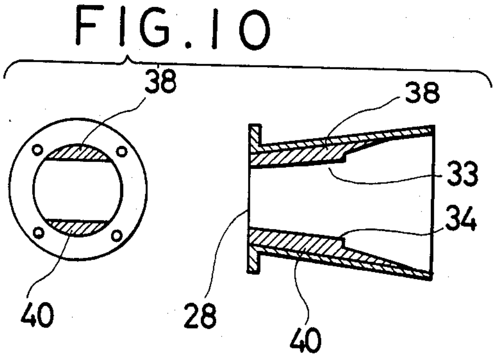
FIG. 10 is a simplified diagram for a fourth embodiment of the primary radiator for circularly polarized wave in accordance with the present invention.
Figure 11:
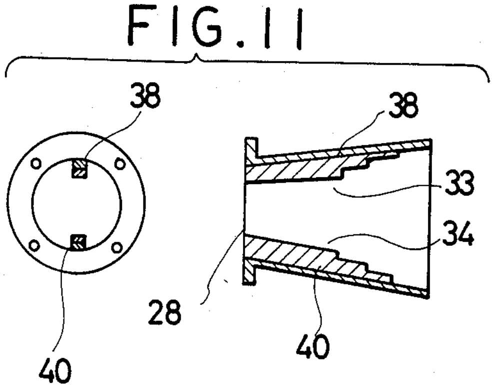
FIG. 11 is a simplified diagram for a fifth embodiment of the primary radiator for circularly polarized wave in accordance with the present invention.
Figure 12:
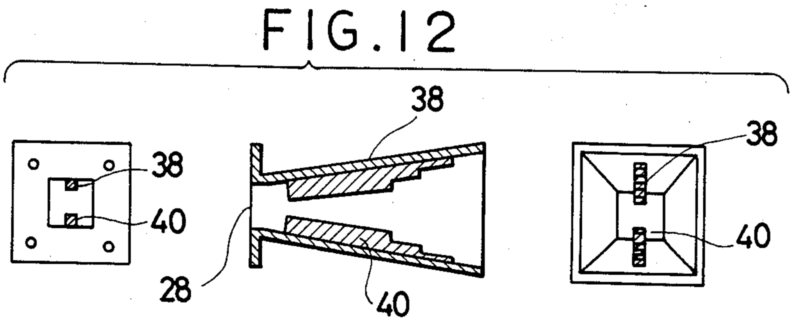
FIG. 12 is a simplified diagram for a sixth embodiment of the primary radiator for circularly polarized wave in accordance with the present invention.

In a fourth embodiment of the invention shown in FIG. 10, the conductor projections 38 and 40 are constructed to have a form for which the ratio $D(x)/R(x)$ does not remain constant. Although the conductor projections 38 and 40 are given difference in the thickness, it is possible to eliminate adverse influence due to higher order modes by designing to give an extremely small value to the difference, and moreover, it is useful for the case of adjusting the phase difference to yield the value of 90° for the design frequency. In a fifth embodiment of the present invention shown in FIG. 11, it differs from FIG. 10 in that the conductor projections consist of plate-like materials. Finally, a sixth embodiment shown in FIG. 12 gives an example of application of the present invention to a rectangular horn antenna.

The present invention can be applied effectively to a horn antenna which widens toward the aperture with gradually changing curvature, a horn antenna which widens with cross section of a polygonal form, a pyramidal horn antenna, or other horn antennas, in addition to a conieal horn antenna like the one shown in FIG. 4. Further, as to the thickness $D(x)$ of the conductor projections, although description was given in conjunction with FIG. 4 in which its ratio to the radius $R(x)$ remains constant everywhere, it is obvious that the ratio need not remain constant everywhere and may well be changed from one point to another.

In summary, according to a primary radiator for circularly polarized wave embodying the present invention, convension to circularly polarized wave is carried out within the horn antenna through installation of conductor projections on the inner wall of the horn antenna. As a result, there is no need for providing a circularly polarized wave generator separately from the horn antenna as is done in the prior art. This helps in reducing the axial length and making the overall size of the radiator small. In addition, the horn antenna is used as a waveguide for the circularly polarized wave generator so that its diameter is large, and hence, wide-band uniformity of axial ratio can be accomplished without requiring to increase the size of the device, as is done in the prior art. In addition, the form of the conductor projections is chosen to suppress the generation of higher order modes so that it is possible to obtain an improved directivity. Moreover, the device can be manufactured with dimensional precision of high accuracy as a result of smaller size of the unit, which will contribute to the stabilization of the axial ratio characteristic during the mass production of the device. Furthermore, accompanying the small size and light weight of the device, there is obtained a spreading effect that the support arm and the support mechanism for the primary radiator for circularly polarized wave can be rendered simple. Fitting well in these situations is the apparatus to be put on board the satellite for which a particular emphasis is placed on its light weightedness. In addition, the manufacturing cost for the device can be reduced further due to small amount of the materials to be consumed. Still further, a reduction in the cost may be expected from an improvement in mass productivity. These are the various active effects that can be derived from the adoption of the present invention.

Various modifications will become possible for those skilled in the art after receiving the teachings of the present disclosure without departing from the scope thereof.

What is claimed is:

1. A circularly polarized wave primary radiator for converting a linearly polarized wave to a circularly polarized wave, comprising:

(a) a horn antenna which is constructed to widen gradually from the feeding edge toward the aperture end; and (b) conductor projections mounted along the inner wall of said horn antenna in order to convert the linearly polarized wave which is incident upon the feeding end to a circularly polarized wave within said horn antenna, wherein said conductor projections are shaped to have edge sections on the aperture end side of said horn antenna that slope down along the inner wall of said horn antenna, and said conductor projections are provided facing one of the mutually orthogonal electric field components $E_1$ and $E_2$ of the electric field E which is incident upon the feeding end of said horn antenna, and the thickness and the length of these conductor projections are set so as to have the phase difference between the orthogonal electric fields $E_1$ and $E_2$ that have the same phase at the feeding end of said horn antenna, will fall at the aperture end within the tolerated range that has 90° as the standard.

2. A primary radiator for a circularly polarized wave as claimed in claim 1, in which said horn antenna opens from the feeding end toward the aperture end with a fixed rate of widening.

3. A primary radiator for a circularly polarized wave as claimed in claim 1, in which said horn antenna opens gradually from the feeding end toward the aperture end with gradually varying curvature.

4. A primary radiator for a circularly polarized wave as claimed in claim 3, in which said horn antenna opens from the edge section on the aperture end side of the conductor projections toward the aperture end with a rate of widening which is greater than the rate for the section between the feeding end and the edge section on the aperture end side of said conductor projections.

5. A primary radiator for a circularly polarized wave as claimed in claim 1, in which the main part of said conductor projections are formed so as to have a constant ratio of the thickness D(x) of the conductor projections to the radius R(x) of the horn antenna.

6. A primary radiator for a circularly polarized wave as claimed in claim 1, in which said conductor projections are formed so as not to have a constant ratio of the thickness D(x) of the conductor projections to the radius R(x) of the horn antenna.

7. A primary radiator for a circularly polarized wave as claimed in claim 1, in which said edge sections of said conductor projections have a plurality of steps that slope down along the inner wall of said horn.

8. A primary radiator for a circularly polarized wave as claimed in claim 1, in which said conductor projections comprise plate-like materials.

* * * * *